Sept. 23, 1958    J. D. WADDLE    2,853,317
TRAILER HITCH
Filed March 1, 1957    2 Sheets-Sheet 1

INVENTOR.
JAMES D. WADDLE,
BY
McMorrow, Berman & Davidson
ATTORNEYS.

Sept. 23, 1958
J. D. WADDLE
2,853,317
TRAILER HITCH
Filed March 1, 1957
2 Sheets-Sheet 2
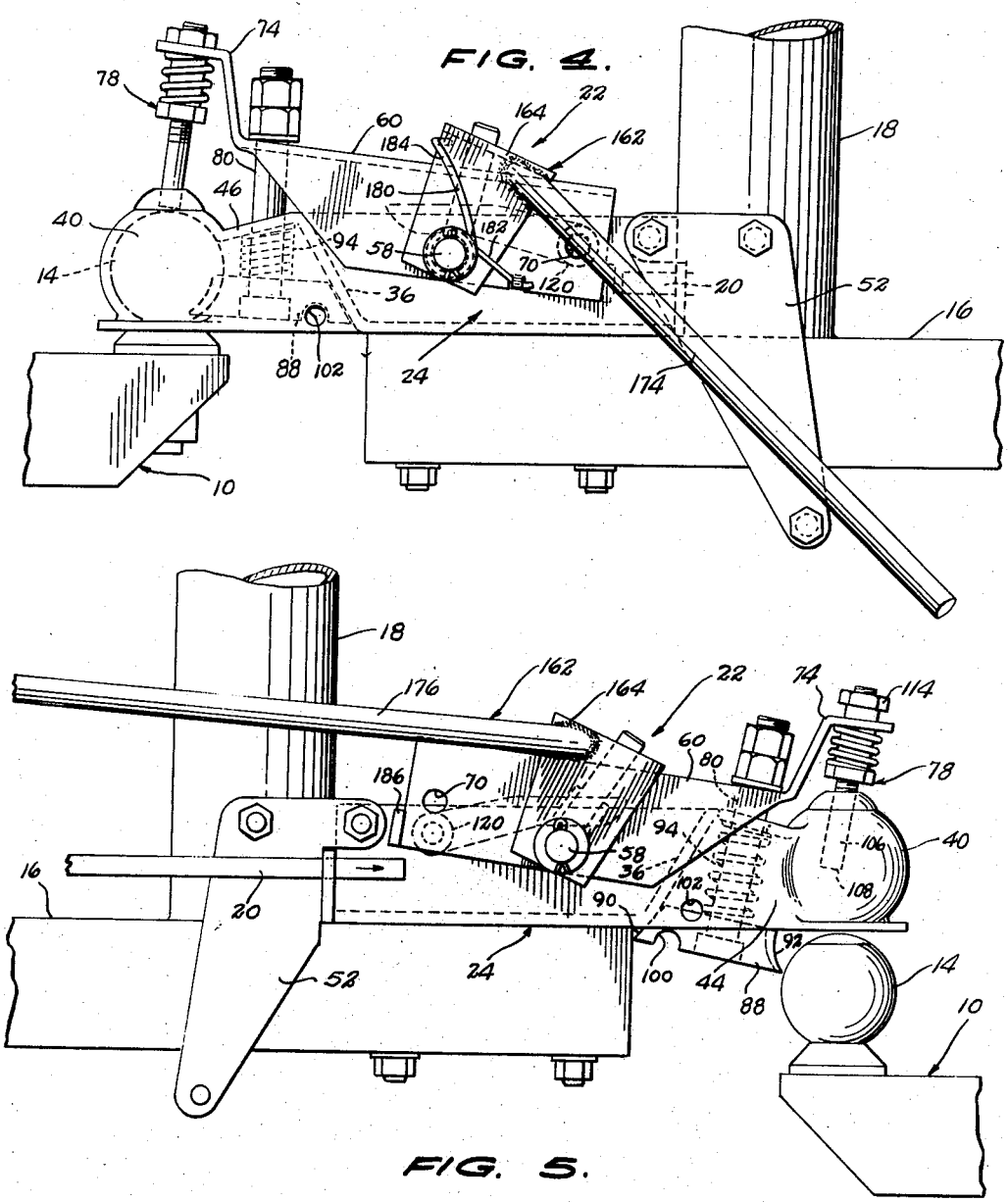

United States Patent Office 2,853,317
Patented Sept. 23, 1958

2,853,317

TRAILER HITCH

James D. Waddle, Somerset, Ky.

Application March 1, 1957, Serial No. 643,315

7 Claims. (Cl. 280—511)

This invention relates generally to vehicle attachments, and is more particularly concerned with a novel trailer hitch for detachably securing a draft and trailing vehicle in tandem.

A primary object of invention in conformance with that set forth is to provide a trailer hitch especially adaptable for use on a boat trailer or the like including means for readily engaging or disengaging the trailer hitch supported on the tongue of a trailer onto the vertically extending mounting ball on a draft vehicle.

Another object of invention in conformance with that set forth is to provide a trailer hitch including a coupling member incorporating a forwardly extending depending recess, the forward end of which being of a spherical configuration partially conforming to a vertically extending mounting ball on a draft vehicle, said coupling member incorporating means for automatically locking the mounting ball of a draft vehicle in the socket portion of the coupling member upon extension of the socket portion on said mounting ball, and further including hand manipulable lever means for releasing the secured relationship between the coupling member and the mounting ball of the draft vehicle.

And yet a still further object of invention in conformance with that set forth is to provide an improved trailer hitch of the character involved which is readily and economically manufactured, easily mounted and maintained, and highly satisfactory, practical and acceptable for the purpose intended.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1:
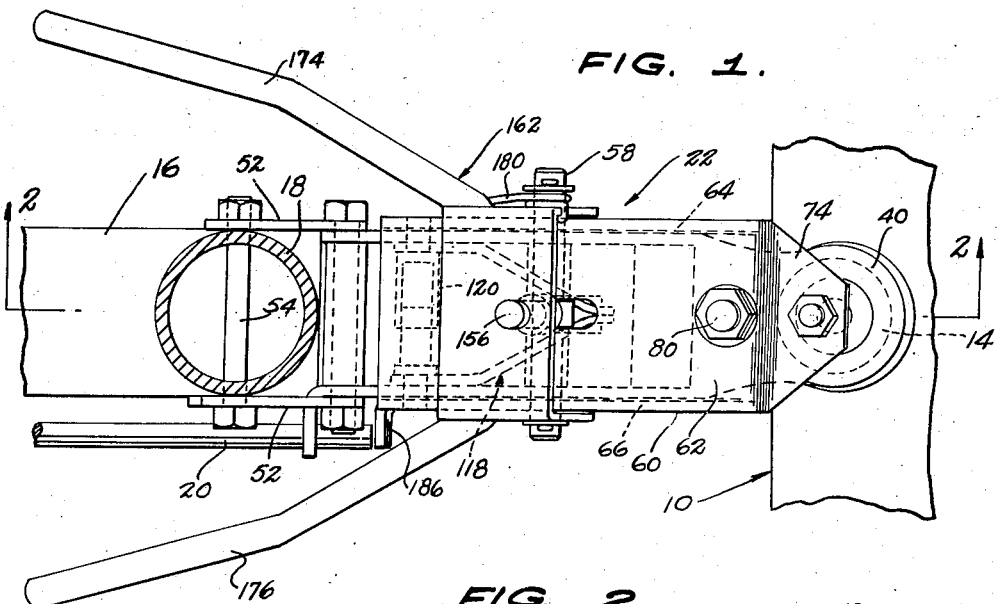
Figure 1 is a top plan view of the novel trailer hitch, showing the same mounted on a fragmentary portion of the tongue of a boat trailer, and showing a fragmentary portion of a draft vehicle having a vertically extending spherical mounting ball thereon.
Figure 2:
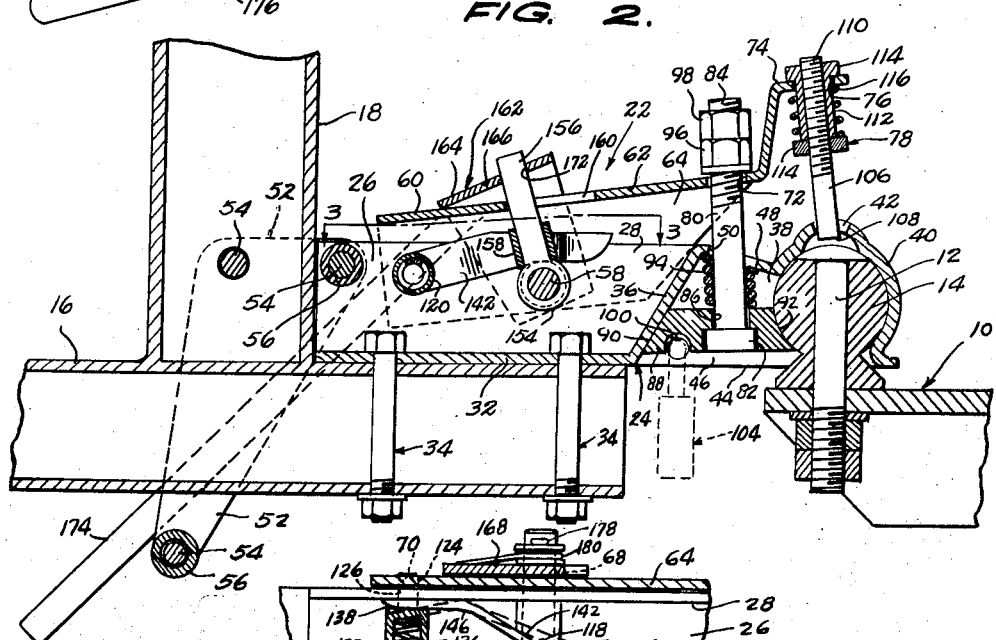
Figure 2 is a section taken substantially on the plane of line 2—2 of Figure 1.

Figure 4 is a side elevation, similar to Figure 2, showing the relative position of the parts when the trailer hitch is locked on the mounting ball of the draft vehicle; and Figure 5 is a side elevation, looking at the side of the hitch opposite that shown in Figure 4, and showing the relative position of the hitch with respect to a mounting ball on a draft vehicle when the hitch is disengaged from said mounting ball.

Referring to the drawing in detail, indicated generally at 10 is a fragmentary rear end portion of a draft vehicle having suitably secured in a transverse aperture a mounting bolt 12 extending through a suitably conformed mounting ball 14. A fragmentary portion of a suitably conformed trailer-tongue is indicated at 16, said tongue including an integral vertically extending post 18 having secured on the upper end thereof suitable launching pulley (not shown). Although not shown, the trailer will incorporate a conventional hand manipulable brake lever for applying brake shoes to the brake drums of the trailer, the lever being vertically pivotal and in engagement with a serrated sector engageable with a spring urged latch. The lever of the brake will incorporate a rearwardly extending abutment rod 20 which will be urged toward the terminal end of the trailer tongue 16 when the brakes are applied, see Figure 5, for example.

Indicated generally at 22 is a preferred embodiment of the novel trailer hitch. Indicated generally at 24 is a coupling member constructed of any suitable material and incorporating a rearwardly disposed upwardly opening recess portion 26, see Figure 2, defined by a pair of opposed side walls 28 and 30 integral with a transverse web 32 transversely apertured and secured in juxtaposition on the upper surface of the tongue 16 by means of suitable mounting bolt assemblies 34. The recess 26 is defined by means of an upwardly angulated transverse abutment wall 36, said abutment wall 36 defining one side of a forwardly extending downwardly opening recess 38. The recess 38 extends beyond the terminal end of the tongue 16 and incorporates at its forward end a spherically conformed socket portion 40 for receiving therein one side portion in the upper end of the mounting ball 14. The socket portion 40 incorporates a transverse aperture through the upper end as indicated at 42. The upper end of the socket portion 40 continues rearwardly in a housing portion 44 extending between the transverse wall 36 and said socket portion, said recess portion incorporating mutually parallel sides 46, one of which being shown in Figure 2, and a transverse top wall 48 transversely apertured as indicated at 50. To aid in retaining the coupling member 24 on the tongue of the trailer, a pair of suitably conformed mounting plates 52 are disposed on opposite sides of the tongue and the vertically extending posts 16 and 18, respectively, said plates having aligned transverse apertures therethrough through which extend suitable mounting bolts 54, some of which incorporating thereon suitable spacer sleeves 56.

The coupling member 24 has extending transversely through the side walls 28 and 30 intermediately of the upwardly opening rear recess 26 a suitable mounting shaft 58. Indicated at 60 is a latch-plate incorporating a transverse web 62 integral with oppositely disposed mutually parallel side walls 64 and 66 which are disposed on the outside of the side walls 28 and 30, respectively, see Figure 3. The side walls 64 and 66 have extending transversely therethrough aligned apertures 68 through which an intermediate portion of the shaft 58 extends accordingly permitting vertical pivotal movement of the latch-plate 60. The side walls 64 and 66 also incorporate a second pair of aligned apertures 70 rearwardly spaced from the apertures 68 for receiving therethrough a suitable lock bolt, see Figure 3, as will subsequently be described in detail. The web 62 of the latch-plate continues forwardly in overlying relationship relative to the recess portion 38, said portion of the web incorporating a transverse aperture 72 therethrough, see Figure 2. Forwardly of the aperture portion 72, the web incorporates a substantially right angular bend portion 74 transversely apertured at 76, said apertured portion 76 having extending therethrough a depending eject-ment pin assembly indicated generally at 78.

The aperture portion 72 of the web 62 has extending therethrough a support rod 80 taking the configuration of an elongated bolt having an enlarged lower head portion 82 and an upper threaded end 84. The lower portion of the support rod 80 extends through a suitably conformed transverse bore portion 86 of a latch-plate 88 extending transversely of the recess 38 between side walls 44 thereof. The rear edge of the latch-plate 88 is angularly conformed as indicated at 90, see Figure 2, for conforming with the adjacent surface of the abutment wall 36, the opposite transverse edge of the latch-plate having a concaved configuration as indicated at 92 complementary to the adjacent surface of the mounting ball 14. The shaft 80 extends through the aperture 50 in the upper wall 48 defining recess 38, said aperture 50 being a relatively loose fit to permit pivotal movement of the latch-plate 60 for disposing the latch block 88 in the position shown in Figure 5 for separating the hitch from the mounting ball 14. The shaft 80 has circumposed thereabout a suitable compression spring 94 opposite ends of which being in engagement with the upper surface of the latch block 88 and the undersurface of the wall 48. The spring 94 aids in the release of the hitch from the mounting ball 14, and disposes said latch block 88 in a position, see Figure 5, to permit the ball 14 to enter the socket portion 40. Mounted on the upper threaded end of the shaft 80 are a pair of suitable nuts 96 and 98, the upper nut 98 serving as a lock nut for maintaining a specific adjusted relationship of the shaft 80 and the latch block 88.

The latch block or plate 88 incorporates transversely thereacross and opening into the under surface thereof an arcuate groove 100 alignable with oppositely disposed and aligned apertures 102 extending through the side walls 44 for receiving therethrough the shackle portion of a suitable lock indicated generally at 104, see Figure 2. This expedient, of course, will prevent tampering with the trailer in an attempt to steal the same, for example, when the trailer it hitched to a draft vehicle.

The ejectment pin assembly 78 comprises an elongated pin member 106, the lower end 108 of which being extendable through the aperture 42 in the socket portion 40 and engageable with the mounting ball 14, as clearly seen in Figure 5, when the hitch is separated from the draft vehicle. The upper end 110 of the pin 106 is suitably threaded having secured thereon a mounting sleeve 112 and retained thereon by means of suitable mounting nuts 114. A suitable compression spring 116 is circumposed about the sleeve 112, one end of which being engaged with the undersurface of the web portion 74, the other end of which being in engagement with the upper surface of the lower retaining nut 114. Thus as the latch-plate 60 is pivoted in a clockwise direction, as viewed in Figure 5, for example, the compression spring 116 will be compressed as indicated in Figure 5, and at the same time the compression spring 94 tends to urge the latch-plate 88 out of engagement with the adjacent side portion of the mounting ball 14, accordingly separating the mounting ball 14 from the hitch as seen in Figure 5. When re-engaging the hitch to the mounting ball 14, the socket portion 40 of the hitch is moved downwardly upon the mounting ball 14, such movement causing engagement of the lower end portion 108 of the pin 106, urging the latch-plate 60 in a counterclockwise direction as viewed in Figure 2, for example, such movement compressing the spring 94 toward the support shaft 80, and disposing the apertures 70 of the latch-plate 60 into a position to be engaged by lock means indicated generally at 118.

Figure 3:
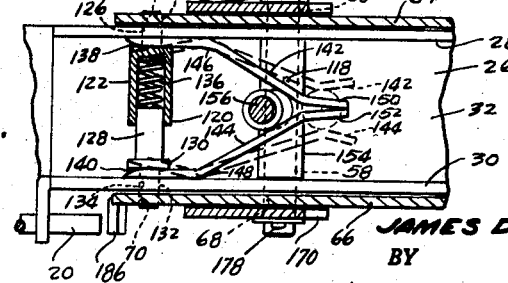
Figure 3 is a fragmentary section taken substantially on the plane of line 3—3 of Figure 2, showing by means of phantom lines the manner in which the cooperating parts of the hitch are manipulated to permit separation between the trailer hitch and the mounting ball upon which the same is mounted.

The lock means 118 includes a two-piece latch bolt 120, see Figure 3, incorporating a tubular housing 122 having extending longitudinally from the closed end thereof a lock pin 124 extending through a suitable transverse aperture 126 in the side wall 28 of the coupling member 24. Telescopically received within the tubular housing 122 is a suitably conformed pin member 128 incorporating an intermediate angular flange 130 and continuing in a reduced diametered longitudinally extending pin 132 which also extends through an aperture portion 134, said aperture portion 134 being in alignment with the aperture portion 126 and extending through the wall 30 of the coupling member. Disposed within the tubular housing 122 is a compression spring 136 which biases the pins 124 and 132 laterally of the outer surface of the respective side walls 28 and 30. Said pins will extend through the apertures 70 in the side walls 64 and 66 of the latch-plate automatically locking the hitch on the mounting ball 14, as seen for example in Figures 1 through 4. The pins 124 and 132 and bolt 120 extend through suitable apertures in the rounded ends 138 and 140, respectively, of the pair of lever elements 142 and 144 which are interposed between inner surface portions of the walls 28 and 30, and the end of the tubular sleeve 122 and the abutment collar 130, respectively. Levers 142 and 144 incorporate an intermediate angular bend or fulcrum portion 146 and 148, respectively, abuttingly engaging the inner surface portion of the respective walls 28 and 30, and continue in inwardly directed converging end portions 150 and 152, respectively. The end portions 150 and 152 extend in overlying relationship relative to the mounting shaft 58, as clearly seen in Figure 3. The mounting shaft 58 has journaled thereon a support sleeve 154 extending between the side walls 28 and 30 of the coupling member, said sleeve having integral therewith and extending laterally therefrom a cam pin 156, an intermediate portion of which having disposed thereon an abutment collar 158 disposed between the opposed inner surfaces of the levers 142 and 144. Considering Figure 3, movement of the camming pin 156 from the solid to the dotted line position shown in Figure 3 will urge the converging ends of the levers 142 and 144 to the dotted line position shown in Figure 3 about the fulcrum portions 146 and 148, respectively, accordingly urging the pin portions 124 and 126 of the bolt 120 out of of engagement with the aperture 70 in the side walls 64 and 66 of the latch-plate 60 and permitting counterclockwise movement of the latch-plate for the purpose of separating the hitch from the mounting ball 14.

The cam pin 156 extends through an elongated lost motion slot portion 160 in the web 62 of the latch-plate, thus permitting counterclockwise rotation thereof prior to counterclockwise movement of the latch-plate accordingly permitting the release of said latch-plate from its locked position before the hitch is separated from the mounting ball. Indicated generally at 162 is an actuating lever assembly utilized for separating the hitch from the mounting ball. The actuating lever assembly incorporates a downwardly opening U-shaped mounting member 164 including a transverse web 166 and mutually parallel sides 168 and 170, said sides 168 and 170 incorporating transverse apertures therethrough received on the mounting shaft 58, see Figure 3, said shaft defining the axis of rotation of the actuating lever assembly 162. The web 166 of the member 164 incorporates a transverse aperture 172 therethrough, see Figure 2, through which the cam pin 156 extends. Suitably secured in diverging relationship from the sides 168 and 170 are suitable handles or levers 174 and 176 for applying the force necessary to rotate the latch-plate 60 in the counterclockwise direction, seen for example in Figure 5, for the purpose of separating the hitch from the mounting ball. Thus counterclockwise rotation of the lever assembly 162 will first free the bolt 122 from its locked engagement with the latch-plate 60, and continued rotation of said latch-plate will separate the hitch from the mounting ball. The mounting shaft 58 has extending transversely through opposite ends thereof suitable cotter pins 178 for retaining the parts in their assembled condition. Circumposed about an intermediate portion of the shaft 58 between the outer surface of the side 168 of member 164 is a suitable torsion or "hairpin" spring 180, one end 182 of which being secured to the latch-plate 60, see Figure 4, the other end 184 of which engaging a forward edge portion of member 164 accordingly biasing the lever assembly 162 to the position shown in Figure 4.

The side wall 66 of the latch-plate 60 has extending laterally from a rear end portion thereof an abutment or lug element 186, the purpose of which will be subsequently described.

In operation, and with reference to Figure 5, in which the rod 20 is in the position in which the trailer hand brake lever has been actuated so as to apply the trailer brakes, the handles 174 and 176 are in the upward position, the socket portion 40 and the pin member 106 are wholly above and free of the mounting ball 14, and the abutment or lug 186 is directly above and overlies the rod 20. When it is desired to couple the tongue 16 to the ball 14, the handles 174 and 176 are actuated so as to tilt the latch plate 60 about the shaft 58 to the extent that the abutment 186 rests upon the adjacent portion of the rod 20 directly underneath, permitting the socket portion 40 and pin member 106 to be shifted manually over the mounting ball 14 to the extent which permits the upper peripheral portion of the ball 14 to be received within the lower portion of the socket portion 40 and the lower end 108 of the pin member 106 engaging the top of the ball. This partially couples the tongue 16 to the ball 14, and holds the trailer against inadvertent separation from the towing vehicle. To complete the coupling of the tongue 16 to the ball 14, the operator then releases the trailer brakes by actuating the trailer hand brake lever so as to effect the withdrawal of the portion of the rod 20 from below the abutment 186. Then, to complete the hitching of the tongue 16 to the ball 14, the socket portion 40 is permitted to fall downwardly and wholly encompass the ball 14, effecting the shifting of the lower end 108 of the pin member 106 to the top of the socket portion 40 and further tilting movement of the latch plate 60 about the shaft 58 so as to bring the abutment 186 to a position blocking the path of movement of the rod 20, the position shown in Figure 4. With the trailer brakes in released position and the tongue 16 completely coupled to the ball 14, the towing vehicle can freely move the trailer, but the trailer brakes cannot be applied. This saves the trailer brakes from being damaged or burned out.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the appended claims.

What is claimed is:

1. In a trailer hitch for use on a trailer tongue to detachably connect the same to the vertical mounting ball on a draft vehicle, a coupling member including rear upwardly opening and forward downwardly opening recesses defined by an intermediate transverse abutment wall, means engageable with the coupling member for securing the same on a trailer tongue with the downwardly opening recess extending beyond the terminal end thereof, the downwardly opening recess including a spherically conformed socket portion for receiving a portion of the mounting ball therein in spaced relation from the abutment wall, a latch-plate intermediately pivoted on a pivot shaft on the coupling member above the upper surface thereof, a support rod extending through an intermediate portion of the forward recess, a latch block on the lower end of the support rod in the forward recess and extending transversely between the abutment wall and socket portion for retaining or releasing the mounting ball therein in response to pivotal movement of the latch-plate, lock means in the coupling member biased toward locking engagement with the latch-plate for retaining the same in a fixed position for locking the mounting ball in the socket portion, an actuating lever rotatably supported on the axis of rotation of the latch-plate and including an abutment portion engageable with the latch-plate for pivoting the forward end thereof toward the socket portion to release the mounting ball therefrom, lock release means carried on the axis of rotation of the actuating lever for movement thereon and including means engageable with the lock means for releasing the same and permitting pivotal movement of the latch-plate.

2. In a trailer hitch for use on a trailer tongue to detachably connect the same to the vertical mounting ball on a draft vehicle, a coupling member including rear upwardly opening and forward downwardly opening recesses defined by an intermediate transverse abutment wall, means engageable with the coupling member for securing the same on a trailer tongue with the downwardly opening recess extending beyond the terminal end thereof, the downwardly opening recess including a spherically conformed socket portion for receiving a portion of the mounting ball therein in spaced relation from the abutment wall, a latch-plate intermediately pivoted on a pivot shaft on the coupling member above the upper surface thereof, a support rod extending through an intermediate portion of the forward recess, a latch block on the lower end of the support rod in the forward recess and extending transversely between the abutment wall and socket portion for retaining or releasing the mounting ball therein in response to pivotal movement of the latch-plate, lock means in the coupling member biased toward locking engagement with the latch-plate for retaining the same in a fixed position for locking the mounting ball in the socket portion, an actuating lever rotatably supported on the axis of rotation of the latch-plate and including an abutment portion engageable with the latch-plate for pivoting the forward end thereof toward the socket portion to release the mounting ball therefrom, lock release means carried on the axis of rotation of the actuating lever for movement thereon and including means engageable with the lock means for releasing the same and permitting pivotal movement of the latch-plate, said latch-plate including an ejectment pin depending from a forward end portion thereof for extension into the socket portion for urging the mounting ball therefrom due to downward pivotal movement of the latch-plate in response to movement of the actuating lever, reverse movement of the socket portion onto the mounting ball urging the ejectment pin out of the socket portion and counter-rotating the latch-plate for locking the same in a fixed position relative to the coupling member.

3. In a trailer hitch for use on a trailer tongue to detachably connect the same to the vertical mounting ball on a draft vehicle, a coupling member including rear upwardly opening and forward downwardly opening recesses defined by an intermediate transverse abutment wall, means engageable with the coupling member for securing the same on a trailer tongue with the downwardly opening recess extending beyond the terminal end thereof, the downwardly opening recess including a spherically conformed socket portion for receiving a portion of the mounting ball therein in spaced relation from the abutment wall, a latch-plate intermediately pivoted on a pivot shaft on the coupling member above the upper surface thereof, a support rod extending through an intermediate portion of the forward recess, a latch block on the lower end of the support rod in the forward recess and extending transversely between the abutment wall and socket portion for retaining or releasing the mounting ball therein in response to pivotal movement of the latch-plate, lock means in the coupling member biased toward locking engagement with the latch-plate for retaining the same in a fixed position for locking the mounting ball in the socket portion, an actuating lever rotatably supported on the axis of rotation of the latch-plate and including an abutment portion engageable with the latch-plate for pivoting the forward end thereof toward the socket portion to release the mounting ball therefrom, lock release means carried on the axis of rotation of the actuating lever for movement thereon and including means engageable with the lock means for releasing the same and permitting pivotal movement of the latch-plate, said latch-plate including an ejectment pin depending from a forward end portion thereof for extension into the socket portion for urging the mounting ball therefrom due to downward pivotal movement of the latch-plate in response to movement of the actuating lever, reverse movement of the socket portion onto the mounting ball urging the ejectment pin out of the socket portion and counter-rotating the latch-plate for locking the same in a fixed position relative to the coupling member, said lock means comprising a spring-urged bolt extendable laterally from the coupling member and receivable in an aperture portion of the latch-plate.

4. In a trailer hitch for use on a trailer tongue to detachably connect the same to the vertical mounting ball on a draft vehicle, a coupling member including rear upwardly-opening and forward downwardly opening recesses defined by an intermediate transverse abutment wall, means engageable with the coupling member for securing the same on a trailer tongue with the downwardly opening recess extending beyond the terminal end thereof, the downwardly opening recess including a spherically conformed socket portion for receiving a portion of the mounting ball therein in spaced relation from the abutment wall, a latch-plate intermediately pivoted on a pivot shaft on the coupling member above the upper surface thereof, a support rod extending through an intermediate portion of the forward recess, a latch block on the lower end of the support rod in the forward recess and extending transversely between the abutment wall and socket portion for retaining or releasing the mounting ball therein in response to pivotal movement of the latch-plate, lock means in the coupling member biased toward locking engagement with the latch-plate for retaining the same in a fixed position for locking the mounting ball in the socket portion, an actuating lever rotatably supported on the axis of rotation of the latch-plate and including an abutment portion engageable with the latch-plate for pivoting the forward end thereof toward the socket portion to release the mounting ball therefrom, lock release means carried on the axis of rotation of the actuating lever for movement thereon and including means engageable with the lock means for releasing the same and permitting pivotal movement of the latch-plate, said latch-plate including an ejectment pin depending from a forward end portion thereof for extension into the socket portion for urging the mounting ball therefrom due to downward pivotal movement of the latch-plate in response to movement of the actuating lever, reverse movement of the socket portion onto the mounting ball urging the ejectment pin out of the socket portion and counter-rotating the latch-plate for locking the same in a fixed position relative to the coupling member, said lock means comprising a spring-urged telescoping lock bolt extending transversely of the rear recess, opposite ends thereof being extendable laterally through the coupling member in rearwardly spaced relation from the pivot axis of the latch-plate, the latch-plate including apertured side portions alignable on opposite sides of the coupling member for receiving the ends of the lock bolt therethrough, the lock release means comprising a pair of lever elements abuttingly engageable at one end on opposite ends of the lock bolt for telescoping the same and freeing the latch-plate for pivotal movement on the transverse pivot shaft, said lever elements including an intermediate fulcrum portion engaged on opposite sides of the rear recess of the coupling member and including converging forward end portions above the pivot shaft of the latch-plate, and a cam pin secured normal to the pivot shaft between the converging ends of the lever elements, forward pivotal movement of the cam pin urging the forward ends of the levers apart about the fulcrum portions and urging the rear ends thereof toward each other for freeing the latch-plate for pivotal movement.

5. In a trailer hitch for use on a trailer tongue to detachably connect the same to the vertical mounting ball on a draft vehicle, a coupling member including rear upwardly opening and forward downwardly opening recesses defined by an intermediate transverse abutment wall, means engageable with the coupling member for securing the same on a trailer tongue with the downwardly opening recess extending beyond the terminal end thereof, the downwardly opening recess including a spherically conformed socket portion for receiving a portion of the mounting ball therein in spaced relation from the abutment wall, a latch-plate intermediately pivoted on a pivot shaft on the coupling member above the upper surface thereof, a support rod extending through an intermediate portion of the forward recess, a latch block on the lower end of the support rod in the forward recess and extending transversely between the abutment wall and socket portion for retaining or releasing the mounting ball therein in response to pivotal movement of the latch-plate, lock means in the coupling member biased toward locking engagement with the latch-plate for retaining the same in a fixed position for locking the mounting ball in the socket portion, an actuating lever rotatably supported on the axis of rotation of the latch-plate and including an abutment portion engageable with the latch-plate for pivoting the forward end thereof toward the socket portion to release the mounting ball therefrom, lock release means carried on the axis of rotation of the actuating lever for movement thereon and including means engageable with the lock means for releasing the same and permitting pivotal movement of the latch-plate, said latch-plate including a laterally extending abutment element for engaging a longitudinally reciprocable rod movable responsive to the application and release of the brakes of said trailer upon which the hitch is mounted and preventing coupling of the hitch on the mounting ball while the trailer brakes are applied.

6. In a trailer hitch for use on a trailer tongue to detachably connect the same to the vertical mounting ball on a draft vehicle, a coupling member including rear upwardly opening and forward downwardly opening recesses defined by an intermediate transverse abutment wall, means engageable with the coupling member for securing the same on a trailer tongue with the downwardly opening recess extending beyond the terminal end thereof, the downwardly opening recess including a spherically conformed socket portion for receiving a portion of the mounting ball therein in spaced relation from the abutment wall, a latch-plate intermediately pivoted on a pivot shaft on the coupling member above the upper surface thereof, a support rod extending through an intermediate portion of the forward recess, a latch block on the lower end of the support rod in the forward recess and extending transversely between the abutment wall and socket portion for retaining or releasing the mounting ball therein in response to pivotal movement of the latch-plate, lock means in the coupling member biased toward locking engagement with the latch-plate for retaining the same in a fixed position for locking the mounting ball in the socket portion, an actuating lever rotatably supported on the axis of rotation of the latch-plate and including an abutment portion engageable with the latch-plate for pivoting the forward end thereof toward the socket portion to release the mounting ball therefrom, lock release means carried on the axis of rotation of the actuating lever for movement thereon and including means engageable with the lock means for releasing the same and permitting pivotal movement of the latch-plate, said latch-plate including an ejectment pin depending from a forward end portion thereof for extension into the socket portion for urging the mounting ball therefrom due to downward pivotal movement of the latch-plate in response to movement of the actuating lever, reverse movement of the socket portion onto the mounting ball urging the ejectment pin out of the socket portion and counter-rotating the latch-plate for locking the same in a fixed position relative to the coupling member, said support rod including a compression spring circumposed thereon with opposite ends engaging the upper wall of the forward recess and the latch-block for compression therebetween when the latch-plate is locked to the coupling member and urging the latch-plate away from the mounting ball upon which the coupling member is secured.

7. In a trailer hitch for use on a trailer tongue to detachably connect the same to the vertical mounting ball on a draft vehicle, a coupling member including rear upwardly opening and forward downwardly opening recesses defined by an intermediate transverse abutment wall, means engageable with the coupling member for securing the same on a trailer tongue with the downwardly opening recess extending beyond the terminal end thereof, the downwardly opening recess including a spherically conformed socket portion for receiving a portion of the mounting ball therein in spaced relation from the abutment wall, a latch-plate intermediately pivoted on a pivot shaft on the coupling member above the upper surface thereof, a support rod extending through an intermediate portion of the forward recess, a latch block on the lower end of the support rod in the forward recess and extending transversely between the abutment wall and socket portion for retaining or releasing the mounting ball therein in response to pivotal movement of the latch-plate, lock means in the coupling member biased toward locking engagement with the latch-plate for retaining the same in a fixed position for locking the mounting ball in the socket portion, an actuating lever rotatably supported on the axis of rotation of the latch-plate and including an abutment portion engageable with the latch-plate for pivoting the forward end thereof toward the socket portion to release the mounting ball therefrom, lock release means carried on the axis of rotation of the actuating lever for movement thereon and including means engageable with the lock means for releasing the same and permitting pivotal movement of the latch-plate, said coupling member including transversely aligned apertures in opposite side wall portions of the forward recess beneath the latch block for receiving therethrough the transversely disposed shackle of a lock or the like for preventing separation of the hitch from the mounting ball on the draft vehicle.

No references cited.